United States Patent
Maruta et al.

(10) Patent No.: US 6,660,294 B2
(45) Date of Patent: *Dec. 9, 2003

(54) POULTRY EGGSHELL STRENGTHENING COMPOSITION

(75) Inventors: Kiyoshi Maruta, Kanagawa (JP); Hiroshi Miyazaki, Kanagawa (JP)

(73) Assignee: Calpis Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 361 days.

(21) Appl. No.: 09/269,725

(22) PCT Filed: Oct. 1, 1997

(86) PCT No.: PCT/JP97/03509

§ 371 (c)(1), (2), (4) Date: Apr. 2, 1999

(87) PCT Pub. No.: WO98/14560

PCT Pub. Date: Apr. 9, 1998

(65) Prior Publication Data

US 2001/0046484 A1 Nov. 29, 2001

(30) Foreign Application Priority Data

Oct. 2, 1996 (JP) .............................. 8-261633

(51) Int. Cl.$^7$ .............................. A23K 1/17; C12R 1/07
(52) U.S. Cl. .................. 424/442; 426/61; 426/623; 426/630; 426/635; 426/636; 435/252.5; 435/839
(58) Field of Search .............................. 424/93.3, 442; 435/252.1, 252.5, 839; 426/61, 623, 630, 635, 636

(56) References Cited

U.S. PATENT DOCUMENTS 4,919,936 A * 4/1990 Iwanami et al. ............ 424/442

* cited by examiner

Primary Examiner—Deborah Crouch
Assistant Examiner—Joseph Woitach
(74) Attorney, Agent, or Firm—Oblon, Spivak, McClelland, Maier & Neustadt, P.C.

(57) ABSTRACT

A poultry eggshell strengthening composition for enhancing eggshell thickness and external eggshell membrane thickness, containing a viable microorganism of the genus Bacillus as an active ingredient, optionally together with a carrier or diluent.

13 Claims, No Drawings

POULTRY EGGSHELL STRENGTHENING COMPOSITION

BACKGROUND OF THE INVENTION

1. Field of the Invention

The present invention relates to a poultry eggshell strengthening composition capable of enhancing the strength of poultry eggshells by addition to feeds for poultry, such as fowl, and feeding it to the poultry.

2. Description of the Background

Eggs of poultry, such as fowl, are often broken when laid, or during handling steps including egg collection, selection, washing, packaging, transportation, display, selling, storage, and the like. The strength of poultry eggs relates to the eggshell structure and correlates to the thickness and specific gravity of the eggshell [see, Shinpen Chikusan Daijiten, p. 463, published by Yokendo]. The eggshell structure is composed of the eggshell, the eggshell membrane and the cuticle. A fowl eggshell weighs about 5 g on average, has a thickness of from 300 to 360 μm and is composed of about 98% inorganic matter (98.4% calcium carbonate with magnesium carbonate and calcium phosphate each in a trace amount) and about 2% organic matter, by weight. A fowl eggshell membrane has a thickness of about 70 μm and consists of the external eggshell membrane and the internal eggshell membrane. At the obtuse end of the egg, the external eggshell membrane and the internal eggshell membrane split forming the air chamber The eggshell membrane is composed of about 90% proteins, about 3% lipids and about 2% saccharides, by weight. A fowl egg cuticle is a shapeless coating formed on the surface of the eggshell immediately after egg-laying, from the drying of gelatinous material secreted at egg laying. It is composed of about 85% to 87% proteins, about 3.5% to 3.7% saccharides and about 2.5% to 3.5% lipids, by weight. The eggshell thickness varies depending on temperature and age. Namely, eggshell thickness becomes thinner at higher temperatures or as aging proceeds.

Since calcium is the major component of eggshell, the blood calcium level would relate to the formation of eggshell. Calcium absorbed from the intestinal tract is first accumulated in the femora and then liberated, when necessary, into the blood in the form of osteoblasts, thus participating in the eggshell formation. Therefore, poultry eggshells can be thickened by promoting the absorption and metabolism of calcium. Although the role of the eggshell membrane is not known in detail, it is assumed that the eggshell can be strengthened as the eggshell membrane is thickened together with the eggshell.

Attempts have been made to thicken poultry eggshell by, for example, adding various calcium materials to feeds, improving feeding methods, or administering CPP (casein phospho peptide) and CCM (calcium citrate malate). However, no method has been developed which is satisfactory for those concerned with large scale egg collection having a small profit margin. Thus, there has been a need to develop techniques whereby poultry eggshell can be strengthened by convenient procedures.

It is reported that various viable microorganism preparations contribute to poultry body weight gain, improvement in meat qualities, increase in the ratio of egg laying, suppression and decrease in harmful enterobacteria bacteria, and the like. These preparations have been already put into practical use for various purposes. It is also reported that eggshells can be slightly thickened and the ratio of eggs with thin eggshell can be reduced by adding a preparation containing Lactobacillus acidophilus, Lactobacillus casei, Bifidobacterium bifidum, Aspergillus oryzae and Torulopsis sp. to a feed. However, it has not reported that this preparation achieves a strengthening effect to such a level sufficient to show a significant difference. Moreover, it has never clarified which microorganism exerts the eggshell strengthening effect.

It has been necessary to improve the economical efficiency of poultry farming, since the techniques for increasing feed efficiency ratio and egg laying ratio have been advanced. As a result, there arises a tendency toward intensive poultry farming In association with large-scaled poultry farming, egg collection, selection, washing and packaging are being mechanized. Under these circumstances, it is very important to strengthen the eggshells and external eggshell membranes to improve the resistance to breakage during transportation, display, selling, and the like. Thickening and strengthening of eggshells and external eggshell membranes bring about another advantage in that the resistances against bacteria and oxygen-permeability are also improved and the shelf life of the eggs is consequently prolonged. Therefore, there is a need to develop a practically effective poultry eggshell strengthening composition mainly by those concerned in poultry farming.

SUMMARY OF THE INVENTION

An object of the present invention is to provide a poultry eggshell strengthening composition capable of enhancing eggshell thickness and external eggshell membrane thickness, effectively, in practice, when simply added to poultry feed, and the like.

This and other objects of the present invention have been accomplished by a poultry eggshell strengthening composition for enhancing eggshell thickness and external eggshell membrane thickness, comprising a viable microorganism belonging to *Bacillus subtilis* as an active ingredient, optionally together with a carrier or diluent.

Furthermore, this and other objects of the present invention have been accomplished by a method for enhancing eggshell thickness and external eggshell membrane thickness, comprising administrating to a poultry in need thereof an effective amount of a poultry eggshell strengthening composition comprising a viable microorganism belonging to *Bacillus subtilis* as an active ingredient, optionally together with a carrier or diluent.

The viable microorganism contained in the poultry eggshell strengthening composition of the present invention as the active ingredient belongs to *Bacillus subtilis*, and the microbiological properties thereof are described in *Bergey's Manual of Bacteriology*, Vol. 11 (1986). More specifically, it is preferred to use *Bacillus subtilis* C-3102 having improved effect for strengthening poultry eggshell (Deposit No.: FERM BP-1096; Name of depositary institution: Fermentation Research Institute, Agency of Industrial Science and Technology (present name: National Institute of Bioscience and Human-Technology, Agency of Industrial Science and Technology); Address of depositary institution: 1-3, Higashi 1 chome, Yatabe-machi, Tsukuba-gun, Ibaraki-ken 305 Japan (present address: 1-3, Higashi 1 chome, Tsukuba-shi, Ibaraki-ken 305 Japan); Date of deposit: Jun. 28, 1986). Many different strains of *Bacillus subtilis* are known, such as those described in ATCC *Bacteria and Bacteriophages*, 19th ed., 1996, pages 57–63, hereby incorporated by reference.

The *Bacillus subtilis* as described above can be cultured in a liquid or solid medium containing carbon sources, nitrogen sources, inorganic matter, and the like commonly employed in media for culturing microorganisms. Any carbon source may be used, so long as it can be metabolized by *Bacillus subtilis*. For example, glucose, fructose, sucrose, starch and molasses. Examples of the nitrogen source include peptone, casein hydrolyzate, meat extract and ammonium sulfate. If necessary, the medium may further contain phosphoric acid, salts of potassium, magnesium, calcium, sodium, iron, manganese and the like, vitamins, amino acids, surfactant, and the like. It is preferred to perform the culture aerobically. With respect to the culture condition, it is preferred to use, for example, a liquid medium contained in a jar-fermenter under aeration/agitation, a solid medium of the plate-type or an automated koji-producing fermenter. Culturing is performed at a temperature of 20 to 50° C., preferably 30 to 45° C., for 12 hours to 7 days at a culture pH value of 5 to 9, preferably 6 to 8.

The culture thus obtained may be employed either as such or after concentration. Alternatively, the microorganisms harvested from the culture may be employed either as such or processed together with fillers and the like into a dry powder or granules. As the fillers, examples include calcium carbonate, corn grits, corn flour, defatted rice bran, wheat bran, skim milk powder, and the like.

The eggshell strengthening composition of the present invention may contain a carrier or diluent. The carrier and diluent are not particularly limited, and selected from pharmaceutically or nutritionally acceptable carriers and diluents.

In the present invention, the microorganism belonging to, *Bacillus subtilis* may be subjected to an appropriate mutation treatment, such as exposure to ultraviolet light, X-ray or radiation, and a chemical treatment with a mutagenic compound (e.g., nitrsoguanidine, acridine dye). Mutants may also be prepared by insertion, deletion or substitution of nucleotides, as well as spontaneous mutation. The thus obtained mutants can be used in the present invention as far as they are capable of enhancing eggshell thickness and external eggshell membrane thickness. The term *Bacillus subtilis* includes these mutants.

The eggshell strengthening composition of the present is invention preferably contains from $10^6$ to $10^{11}$ per g of the *Bacillus subtilis* viable microorganism preparations in the form of spores and/or nutritive cells.

It is thought that the eggshell strengthening composition of the present invention promotes the absorption and metabolism of calcium required by poultry so as to enhance the eggshell thickness or external the eggshell membrane thickness. Accordingly, it may be added to, for example, a formula feed for poultry which contains calcium in a sufficient amount needed for egg-laying poultry. It may be administered in an arbitrary method without restriction. In a preferred case, it is processed into preparations which can be uniformly added to marketed feeds and easily given to poultry, in particular, powders. The effective concentration of the eggshell strengthening composition varies depending on the type and age of the poultry, and the like. For example, it may be added to a marketed feed for poultry preferably in such an amount as to give a viable count of $10^3$ to $10^7$ viable microorganisms per g, more preferably $10^4$ to $10^6$ per g, to prepare a feed for strengthening poultry eggshell. When the viable count is less than $10^3$ per g, no significant effect is achieved. On the other hand, it is not advantageous from an economical viewpoint that the viable count exceeds $10^7$ per g, since there is a risk that the increase in cost due to the addition of the viable microorganism preparation might exceed the cost caused by broken eggs.

The poultry whose eggshell thickness and external eggshell membrane thickness are to be enhanced according to the present invention are not particularly restricted. Examples thereof include fowl (chicken), duck, bantam, goose and quail.

EXAMPLES

Having generally described this invention, a further understanding can be obtained by reference to certain specific examples which are provided herein for purposes of illustration only and are not intended to be limiting unless otherwise specified.

Example 1

Preparation of Viable Microorganism Powder:

To 100 kg of deionized water were added 2 kg of molasses, 2 kg of soybean peptone and 100 g of dipotassium phosphate, homogeneously dissolved under stirring. Next, the pH value of the mixture was adjusted to 7.5 by using a 1 N solution of sodium hydroxide. The medium thus obtained was fed into a jar fermenter and sterilized at 95° C. for 60 minutes. After cooling to 37° C., the medium was inoculated with 1 kg of a culture broth of *Bacillus subtilis* C-3102 which had been preliminarily cultured. Subsequently, the microorganism was cultured under aeration/agitation at 37° C. for 40 hours. Then the microorganisms were harvested from the culture broth using a continuous centrifuge (shear press type). After adding the same amount (weight) of skim milk powder thereto, the obtained mixture was freeze-dried in vacuo. The dry microorganism powder (7.5 kg) thus obtained showed a viable count of $1.2 \times 10^{10}$ per g.

Administration for 20 Days in the Best Egg-laying Season:

Egg-laying hens (De Kalb, aged 265 days at the initiation of the test) were classified into a control lot (no administration) and a test lot (administration of $1 \times 10^5$ per g of *Bacillus subtilis* C-3102) each having 20 hens. The preliminary feeding was effected for 7 days followed by the test continued for 20 days. During the pre-feeding period, the hens were fed with a marketed formula feed for high egg-laying period (manufactured by National Federation of Agricultural Co-operative Associations, DCP≧18.0%, ME≧2,900 kcal). During the test period, the hens in the test lot was fed with a feed to which pellets containing $10^7$ per g of the viable microorganisms prepared by the above-mentioned culture process had been added, while the hens in the control lot were continuously fed with the above-mentioned marketed feed as such. After the completion of the test period, the feeds of the test and control lots were replaced with each other. Then the pre-feeding was further effected for 7 days followed by the test continued for 20 days. The eggshell thickness along the minor diameter of each of the eggs laid during the latest 10 days of the test period were measured with a micrometer. The results are shown in Table 1 below. It was thus found that the eggshell thickness in the test lot was enhanced at a significant difference of 5%.

TABLE 1

| Lot | Number of Eggs (n) | Eggshell Thickness (mm): Mean ± s.d. |
|---|---|---|
| Control | 171 | 0.325 ± 0.026 |
| Test | 172 | 0.331 ± 0.026* |

*P < 0.05

Example 2

Administration for 1 Month at the Last Stage of the Egg-laying Season:

This test was performed by using egg-laying hens (De Kalb Tex.) fed in two poultry houses at a ratio of 4,600 hens/house. The test hens were those aged 535 days immediately before All-out (egg-laying ratio at the initiation of the test: 76.5%). The hens in the control lot were fed with a marketed formula feed (manufactured by National Federation of Agricultural Co-operative Associations, DCP≧15.0%, ME≧2,750 kcal), while those in the test lot was fed with the same feed as the one employed in the control lot but containing $3\times10^5$ per g of the viable microorganisms of *Bacillus subtilis* C-3102. One month after the initiation of the test, 100 eggs were sampled at random from each lot and the eggshell thickness was measured in the same manner as in Example 1. The results are shown in Table 2 below. It was thus found that the eggshell thickness in the test lot was enhanced at a significant difference of 0.1%.

TABLE 2

| Lot | Number of Eggs (n) | Eggshell Thickness (mm): Mean ± s.d. |
|---|---|---|
| Control | 100 | 0.352 ± 0.031 |
| Test | 100 | 0.383 ± 0.044*** |

***P < 0.001

Example 3

Administration All Through the Egg Collection Season:

This test was performed by using 4,600 hens fed in a poultry house as a control lot and 6,500 hens fed in another poultry house as a test lot. The hens in the control lot were fed with a marketed formula feed, while those in the test lot was fed with the same feed as the one employed in the control lot but containing $3\times10^5$ per g of the viable microorganisms of *Bacillus subtilis* C-3102. Egg-laying data were collected within 14 months between All-in and All-out. The ratio of defective eggs to the collected ones was calculated. Table 3 shows the results. As a result, it was found that the ratio of defective eggs in the test lot was improved at a significant difference of 1%. Although the eggshell thickness was not measured, it was assumed that the eggshell was strengthened with an increase in the eggshell thickness. Similarly, the egg-laying ratio in the test lot was elevated at a significant difference of 1%.

TABLE 3

| | Control Lot | Test Lot |
|---|---|---|
| Total Number of Hens | 1,744,990 | 2,420,146 |
| Number of Normal Eggs | 1,494,333 | 2,097,731 |
| Number of Defective Eggs | 22,202 | 28,753 |
| Ratio of Defective Eggs (%) | 1.46 (100) | 1.35 (92)** |
| Egg-Laying Ratio (%) | 85.64 (100) | 86.68 (101)** |
| Average Egg Weight (g) | 64.59 (100) | 64.76 (101) |

**p < 0.01

Example 4

Administration at the Last Stage of the Egg-laying Season:

Among the De Kalb TX hens tested in Example 2, individuals with high egg-laying ratio were exclusively fed continuously. The hens in the control lot were fed with a marketed formula seed (manufactured by National Federation of Agricultural Co-operative Associations, DCP≧18.0%, ME≧2,850 kcal), while those in the test lot was fed with the same feed as the one employed in the control lot but containing $3\times10^5$ per g of the viable microorganisms of *Bacillus subtilis* C-3102. By using eggs collected from 626- to 631-days of age, the eggshell thickness and the external eggshell membrane thickness were measured. The internal eggshell membrane was peeled off at the air chamber and then the eggshell was peeled off to thereby take out the external eggshell membrane. Although the external eggshell membrane closely adhered to the eggshell and thus was hardly separated from the eggshell completely, the thicknesses of external eggshell membranes seemingly well separated were measured with a micrometer. The results are shown in Table 4 below. It was thus found that the eggshell thickness and the external eggshell membrane thickness in the test lot were both significantly enhanced.

TABLE 4

| Lot | Number of Eggs (n) | Egg Shell Thickness (mm): Mean ± s.d. | External Eggshell Thickness (mm): Mean ± s.d. |
|---|---|---|---|
| Control | 55 | 0.358 ± 0.029 | 0.059 ± 0.01 |
| Test | 56 | 0.376 ± 0.036** | 0.069 ± 0.009*** |

**P < 0.01,
***P < 0.001

Industrial Applicability

The eggshell strengthening composition of the present invention, which contains *Bacillus subtilis* viable microorganisms as the active ingredient, exhibits effects of promoting the uptake, absorption and metabolism of calcium to enhance eggshell thickness and external eggshell membrane thickness of poultry. Thus, the eggshell strengthening Composition makes it possible to considerably lower the ratio of broken eggs to improve the economical efficiency in the production and distribution of poultry eggs.

Obviously, numerous modifications and variations of the present invention are possible in light of the above-teachings.

It is therefore to be understood that within the scope of the appended claims, the invention may be practiced otherwise than as specifically described herein.

The priority document of the present application, Japanese Patent Application No, Hei 8-261633 filed on Oct. 2, 1996, is hereby incorporated by reference.

What is claimed is:

1. A method for enhancing eggshell thickness and external eggshell membrane thickness, comprising:

identifying poultry producing eggs in need of increased eggshell thickness or eggshell membrane thickness, and administering to said identified poultry an effective amount of a composition comprising viable *B. subtilis* strain C-3102 or a spontaneous mutant thereof that is capable of enhancing eggshell thickness or external eggshell membrane thickness.

2. The method of claim 1, wherein said viable *B. subtilis* strain is *Bacillus subtilis* C-3102, Deposit No. FERM BP-1096.

3. The method according to claim 1, wherein said composition further comprises a carrier or diluent.

4. The method according to claim 1, wherein said composition is a powder.

5. The method of claim 1, where said composition further comprises an ingredient of a poultry feed.

6. The method of claim 1, wherein said composition is added to a poultry feed prior to administration.

7. The method according to claim 1, wherein said composition is added to a marketed feed prior to administration.

8. The method according to claim 1, wherein said composition comprises $10^6$–$10^{11}$ *B. subtilis* per gram.

9. The method according to claim 1, wherein said composition comprises at least $10^7$ *B. subtilis* per gram.

10. The method according to claim 1, wherein said poultry is a chicken.

11. The method of claim 1, wherein said method increases the average eggshell thickness in the range of at least about 1.8%.

12. The method of claim 1, wherein said method increases the average eggshell thickness in the range of at least about 1.8% to about 8.8%.

13. A method for enhancing eggshell thickness and external eggshell membrane thickness, comprising:
   identifying poultry producing eggs in need of increased eggshell thickness or eggshell membrane thickness, and
   administering to said identified poultry in or after best egg-laying season an effective amount of a composition comprising viable *B. subtilis* strain C-3102 or spontaneous mutant thereof that is capable of enhancing eggshell thickness or external eggshell membrane thickness.

* * * * *